(12) United States Patent
Wright et al.

(10) Patent No.: US 6,286,911 B1
(45) Date of Patent: Sep. 11, 2001

(54) ELECTRONIC BRAKE CONTROLLER WITH DISPLAY

(75) Inventors: Eric Wright, Evans Mills; John Allen, Watertown, both of NY (US)

(73) Assignee: New York Air Brake Corporation, Watertown, NY (US)

( * ) Notice: Subject to any disclaimer, the term of this patent is extended or adjusted under 35 U.S.C. 154(b) by 548 days.

(21) Appl. No.: 08/801,918

(22) Filed: Feb. 14, 1997

Related U.S. Application Data

(60) Provisional application No. 60/026,039, filed on Sep. 13, 1996.

(51) Int. Cl.[7] ........................................ B60T 13/74
(52) U.S. Cl. ........................ 303/3; 188/1.11 E; 303/20
(58) Field of Search ........................ 303/3, 15, 20, 303/155, 138; 188/1.11 R, 1.11 E

(56) References Cited

U.S. PATENT DOCUMENTS

| | | | |
|---|---|---|---|
| 5,086,641 | 2/1992 | Roselli | 364/426.05 |
| 5,149,176 * | 9/1992 | Eccleston | 188/1.11 E |
| 5,303,157 * | 4/1994 | Root et al. | 303/3 |
| 5,352,028 * | 10/1994 | Eccleston | 303/20 |
| 5,378,052 * | 1/1995 | Yoshino | 303/3 |
| 5,394,137 * | 2/1995 | Orschek | 188/1.11 E |
| 5,415,465 | 5/1995 | Skantar et al. | 303/3 |
| 5,721,683 | 2/1998 | Joyce, Jr. et al. | |

* cited by examiner

Primary Examiner—Matthew C. Graham
(74) Attorney, Agent, or Firm—Barnes & Thornburg

(57) ABSTRACT

An electronic brake controller for an electropneumatic brake system including a housing having at least one brake operator and a display mounted to display the desired brake action. A controller in the housing determines the position of the operator and provides operator position signals at its outputs and drives the display to display the desired braking action as a function of the determined position of the operator. Additional information provided to the controller may also be displayed.

26 Claims, 2 Drawing Sheets

ELECTRONIC BRAKE CONTROLLER WITH DISPLAY

CROSS-REFERENCE

This application claims the benefit of U.S. Provisional Application No. 60/026039 filed Sep. 13, 1996 titled Locomotive Brake Control Unit with respect to common subject matter.

BACKGROUND AND SUMMARY OF THE INVENTION

The present invention relates generally to electronic brake controllers and more specifically to an electronic brake controller with a display.

In computer controlled railway brake equipment, desired braking actions come from a manual brake stand having an automatic brake and an independent brake handle. These mechanical movements are converted to electrical signals and provided to a microcomputer. The microcomputer controls the train pipelines and reservoirs using an electropneumatic brake interface system. A screen is provided in the cabin to let the operator know various information throughout the train. Typically, the displayed information is the pressure at the main reservoir, equalization reservoir, brake pipe, brake pipe at the end of train and the brake cylinder. An example of a computer controlled railway brake equipment is the CCB system available from New York Air Brake Corporation which is also described in U.S. Pat. No. 5,172,316 which is incorporated herein by reference. An example of the display screen is in FIG. 4 of this patent.

The information from the handle which is displayed as pressure is delayed by a 0.5 to 2 second due to subsystems and interfaced delays. This delay often leads the operator to overshoot the amount of braking effort to be applied. This is a significant problem because braking systems do not permit the operator to reduce the braking effort without releasing the brake entirely (direct release). Although the introduction of a graduated release will improve the situation, it does not entirely remove overshoot. In any case, the control valves on North American freight trains operate only with a direct release locomotive control.

The present invention includes an electronic brake controller for an electropneumatic brake system including a housing having at least one brake operator and a display mounted to the housing to display desired brake action. A controller in the housing determines the position of the operator and provides operator position signals at its outputs and drives the display to display the desired braking action as a function of the determined position of the operator. The controller drives the display to display target equalization reservoir pressure, brake pipe reduction, or percentage of full travel of the operator, all as a function of the determined position of the operator. Alternatively, the controller can drive the display to display the name of the zone the operator is in. The zones would include release, minimum application, service application from 0 to 9, full service and emergency. The zones could also include suppression and handle-off. The ability to provide an instant display at the brake operator would minimize the delay in providing the information and minimize overshoot. Other desired brake action information may be provided which relate to the brake control functions.

Other objects, advantages and novel features of the present invention will become apparent from the following detailed description of the invention when considered in conjunction with the accompanying drawings.

DETAILED DESCRIPTION OF THE DRAWINGS

Figure 1:
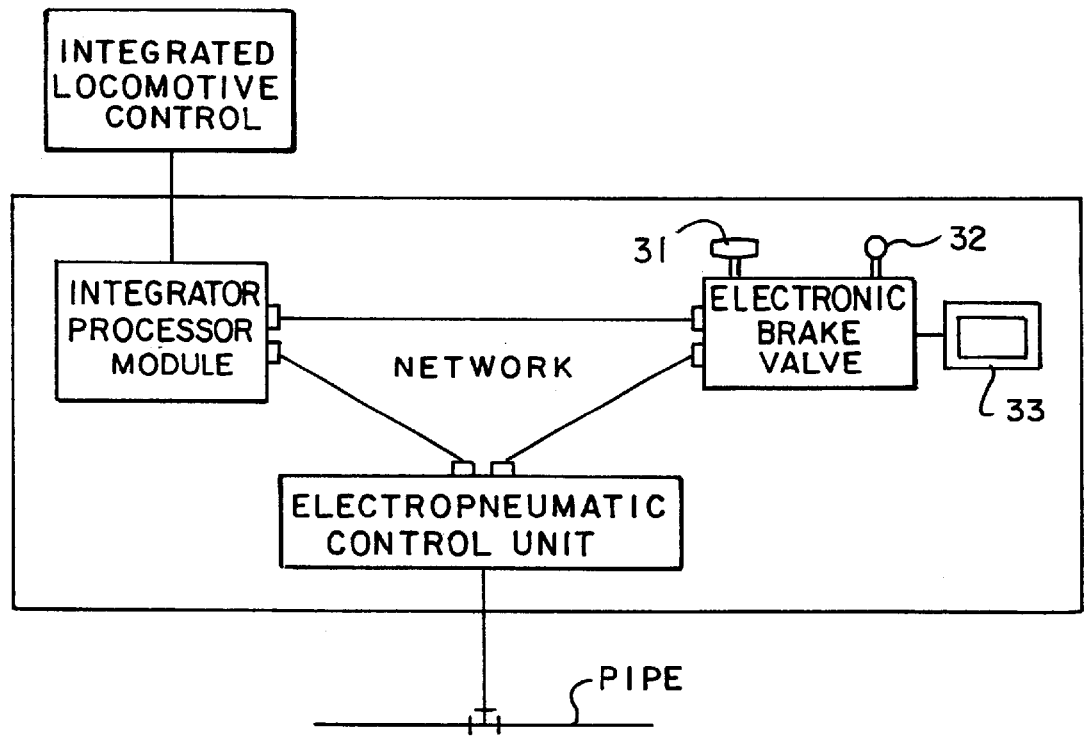
FIG. 1 is a block diagram of a computer controlled railroad brake system.

An overview of a locomotive brake control unit including an electronic brake controller with display according to the present invention is illustrated in FIG. 1. The electronic brake controller with display is shown as electronic brake valve EBV which serves as the input portion through the human-machine interface. The electronic brake valve EBV includes brake operators shown as the automatic brake handle 31, independent brake handle 32 and a bail-off switch (not shown). Alternatively, the brake handles could be replaced with push buttons. An easy to read digital display 33 provides instantaneous information on the equalization reservoir target pressure, for example. This avoids the feedback delay inherent in other systems and allows the locomotive engineers to excise precise braking control. As a failsafe feature, the electric brake valve EBV operates a direct acting emergency venting of the brake pipe. The display 33 is configurable under microprocessor control at electronic brake valve EBV.

An integrated processor module IPM is the host computer for distributive power in an electronic air brake system. The IPM manages the electrical interfaces between the brake system, the locomotive and the train. It communicates with integrated locomotive control ILC and interfaces electrical trainlines(not shown). The IPM also has the ability to handle and/or include distributed power with the appropriate hardware and software upgrades. The IPM provides high level brake control logic, locomotive system integration communication or interfacing. It should be noted that a preferred distributor system is LOCOTROL Distributed Power Control available from GE-Harris. It includes a display, for example, pressure and remote sessions, set up capability (lead/trail), penalties and diagnostic file log.

An electropneumatic control unit EPCU manages the pneumatic interface between the brake system, the locomotive and the train. It controls the locomotive brake cylinders, brake pipe, independent application and release pipe and the actuating pipe, for example. The electropneumatic control unit includes those portions of the system which relate to controlling the individual pipes directly or using reference reservoirs. For example, the pressure in an equalization reservoir is used to pneumatically control the pressure in the brake pipe, which in turn pneumatically transmits brake control signals to the brakes on each car in the train.

The different portions of the locomotive control unit are interconnected by an Echelon LonWorks Network. This not only interconnects the modules of the EPCU, but also connects the EPCU to the IPM and EBV and the train EP brakes. The system also has the capability of communicating with electropneumatic controls to each of the individual cars. Since the American Association of Railroads, AAR, has selected a standard for electropneumatic car brakes incorporating the Echelon LonWorks communication protocol, ease of communication is improved. This reduces the number of protocols throughout the train system. The intercommunication of the line replaceable units also allows communication between the line replaceable units or modules and allows a backup or redundancy of one unit for another.

Figure 2:
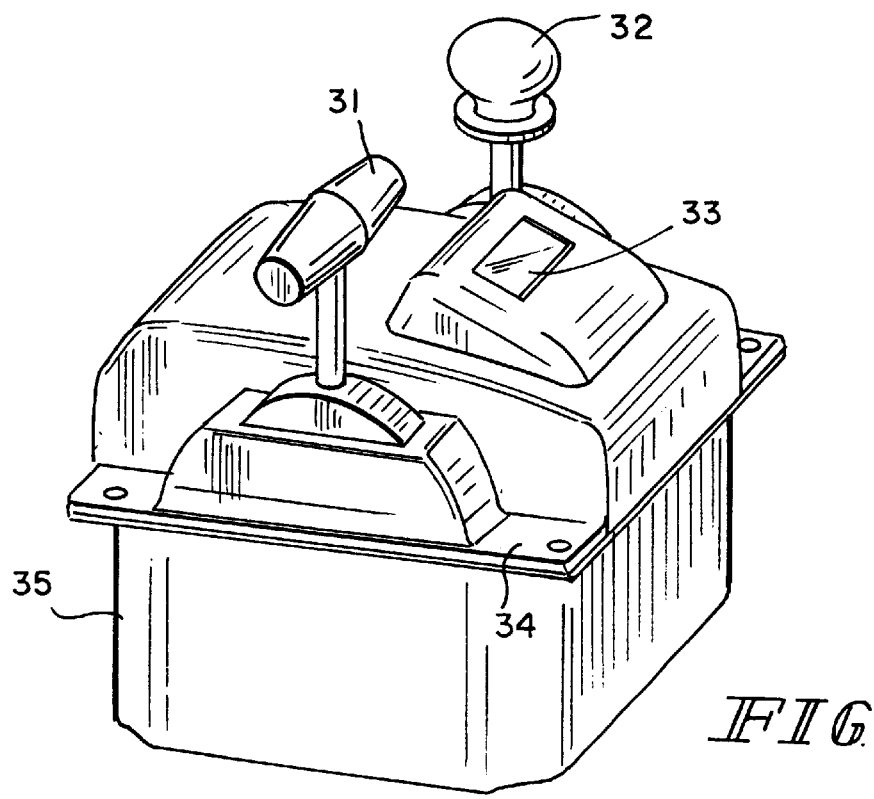
FIG. 2 is a perspective view of an electronic brake controller with display according to the principles of the present invention.

The automatic brake handle 31 has six positions as illustrated in FIG. 2 and defined as follows:

a) The Release position is for charging the brake equipment and releasing the train brakes.

b) In the Minimum Reduction position, brake pipe pressure is reduced a minimum amount so as to initiate quick service on the train brakes (typically 4–6 psi brake pipe reduction), and lightly apply the train brakes.

c) The sector or zone between the Minimum Reduction and Full Service positions is the service zone and may divide into ten settings from 0 through 9 proportional to handle position. As the automatic brake handle is moved through this zone from Minimum Reduction toward Full Service, brake pipe pressure is reduced proportionally to 23–26 psi with the handle at the Full Service position, a full service brake application is obtained.

d) In addition to providing full service brake application as with the brake valve handle in the Full Service position, Suppression of overspeed control and safety control application is obtained in the suppression position.

e) The handle is movable to the Handle of f position as for trailing units of a multiple unit locomotive or for locomotive's being towed "dead" in a train. The handle off position is also used for "overreductions" allowing brake pipe to be reduced further than attainable in the Full Service position. Thus assuring full train brake applications.

f) The Emergency position is used for making brake valve emergency brake applications and results in brake pipe exhaust and brake pipe venting at the highest rate of reduction.

The electronic brake valve EBV also responds to movement of an independent brake handle 32 by the train operator to control the application and release of the locomotive brakes independently of the train brakes. The independent brake handle 32 has two extreme positions, Release and Full Application separated by an application zone as shown in FIG. 2. As the handle is moved from the Release position through the application zone toward the Full Application position, it will apply the locomotive brakes.

The bailoff operator causes the release of any automatic brake application existing on the locomotive (due to operation of the automatic brake handle 31). If the independent brake handle 32 is in an Application position, the locomotive brake will be applied according to the higher of independent or automatic brake. The bailoff operator could be included as part of the independent brake handle 32, the automatic brake handle 31 or an independent button on or off the brake handles. If a separate button is not used, depressing or lifting one of the brake handles would produce bailoff.

As illustrated in FIG. 2, the automatic and independent handles 31 and 32 as well as the display 33 are mounted in a housing of the electronic brake valve EBV. The housing includes a cover 34 and a base 35. The display itself is mounted in the cover 34 while the electronics and any pneumatic connections and controls are provided in the base 35. The electronic brake valve EBV provides the human to computer interface for control of the automatic brake, bailoff and independent brake functions. The electronic brake valve with EBV receives signals representing the position of the automatic brake handle 31 and the independent brake handle 32 and determines the position of the handles. It uses this information to drive the display 33 as well as providing the handle positions, which represent desired braking action to the IPM and the EPCU.

Figure 3:
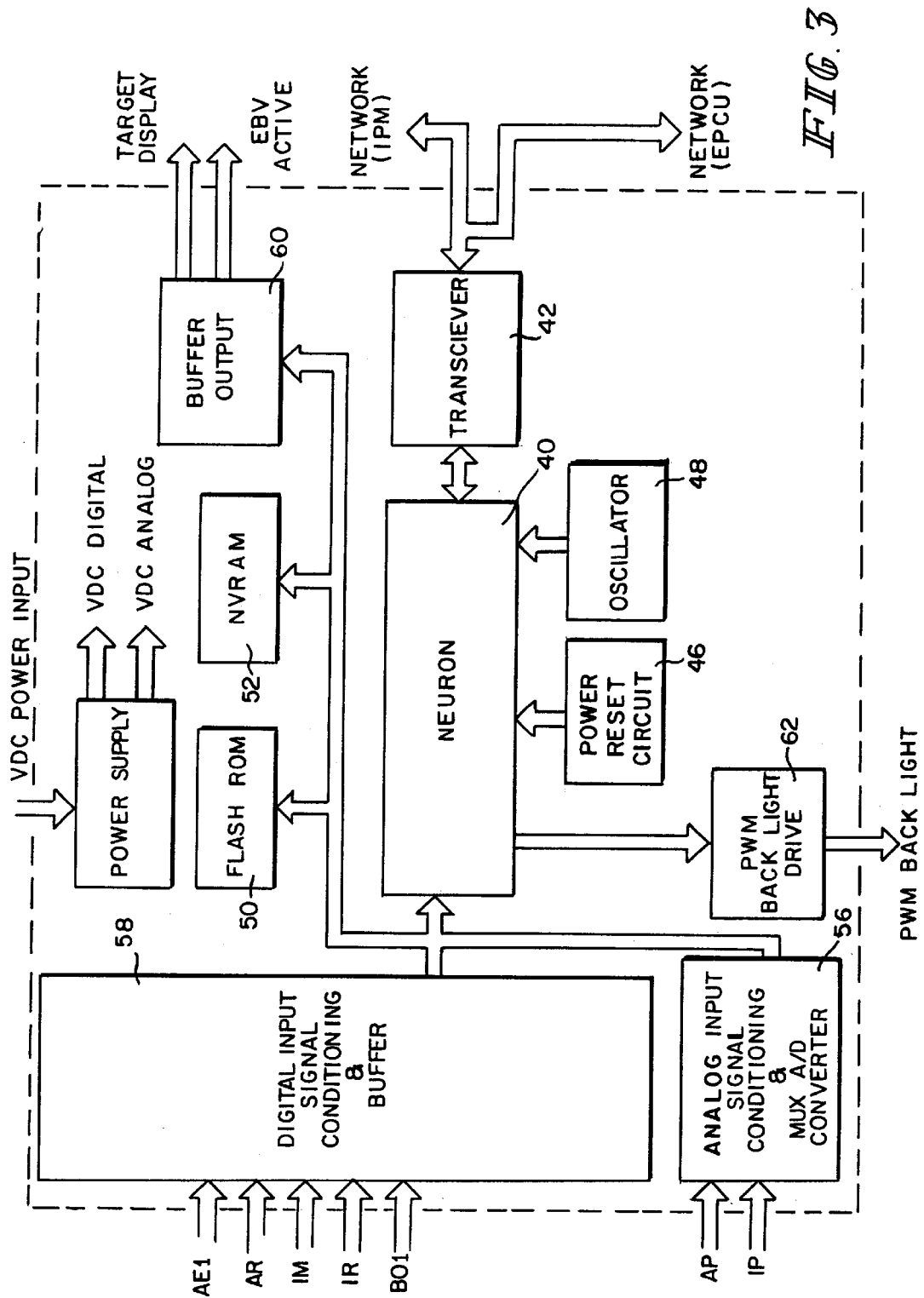
FIG. 3 is a block diagram schematic of an electronic brake controller.

An electronic brake valve control node is shown diagramically in FIG. 3. A microcomputer 40, illustrated as a Neuron chip of a Lonworks Network, via a transceiver 42 communicates over a line network with the IPM and the EPCU. Power reset circuit 46 and oscillator 48 are connected to the microcomputer 40. Also, flash ROM 50 and NVRAM 52 are in communication with the microcomputer 40. A power source 54 receives an external voltage, for example 24 volts, and provides internal DC digital and analog voltages, for example, 5 volts. Analog input signal conditioning and mux A/D converter 56 receives analog signals AP and IP from the automatic and independent brake handles 31 and 32 respectfully.

The automatic brake handle 31 provides an analog signal to the microcomputer 40 to the level of command brake or special commands as shown in FIG. 2. The Release position provides maximum level of the analog signal to the microcomputer 40 to charge the brake pipe fully or automatically release the brakes. The Minimum brake application position provides a linear decrease in its analog output signal proportional to the extremes between release and emergency positions. This signals the microcomputer 40 and in turn the EPCU to reduce the brake pipe pressures sufficient to initiate quick service and set the brakes on the cars. This is generally a 4 to 6 psi brake pipe reduction. The Full Service brake application position provides a further decrease in its analog signal. Movement of the handle 31 from the Minimum position signals further reduction of the brake pipe proportional to the handle position up to the Full Service or maximum service brake position.

The microcomputer 40 via EPCU controls the brake pipe in such a manner that via the Full Service position is the maximum service brake available for the initial brake pipe setting. The microcomputer 40 has the capability of proportioning the brake pipe signals as a function of release minimum service to a full service application based on the initial brake pipe setting.

A Suppression position provided on a standard automatic handle 31 may be ignored by the microcomputer logic. It is only provided for the engineers convenience. The purpose of the Suppression position is to indicate that the handle is in Full Service to the overspeed and/or safety control logic, therefore the Full Service position is sufficient for this purpose. The Handle Off position is also not required but may be used to signal to the microcomputer 40 and in turn the EPCU to reduce the brake pipe pressure to zero. The Emergency position has the least analog output and signals the microcomputer 40 that an emergency reduction of the brake pipe is required. This position mechanically sends the brake pipe directly to atmosphere and results in an emergency application regardless of state of the computer or cut-off device to be described later.

Although the movement of automatic brake handle 31 from Full Service towards Release may increase analog signal, microcomputer 40 will not react in the direct release mode. Brake pipe charge or brake release command may only be achieved in the Release position. If preferred, the logic can be changed to allow gradual brake release operation.

For failure of the automatic brake handle 31 or loss of the analog signal, the microcomputer 40 will interpret this as a reduction of the brake pipe to zero at a service rate. This is the same command as the Handle Off position.

The independent brake handle 32, which provides independent control over the locomotive brake versus the train brake of the automatic brake handle 31, also provides an analog output signal to the microcomputer 40 proportional to handling extreme positions. Unlike the automatic brake handle 31, loss of an analog signal from the independent brake handle 32 results in releasing the locomotive brake and does not result in a brake application as in the independent brake handle failure. Thus the engineer has the option of completing the run or moving to a sidetrack from the leading cab. Independent brake handle 32 moves between the Release position as a minimum analog output signal to the Full position which has the maximum analog output signal. This movement will result in a fully variable analog output signal in either direction and a fully variable increase and decrease of pressure in the independent application and release pipe under the command of EPCU.

A digital input signal conditioning and buffer 58 receives digital input signals provided by various switches in the electronic brake valve EBV. The five inputs include a release switch AR and an emergency switch AE1 found on the automatic handle 31 to indicate that the handle is at either limits of its movement. A release switch IR and a full switch IM are found on the independent handle 32 to indicate that the handle at either limit of its movement. A bail-off switch B01 is the fifth input and is used by the operator to indicate to the system its desire to release any automatic brake on the locomotive that may be applied. This is provided by depressing the independent brake handle 32 or any other mechanism.

The microcomputer 40, determines the position of the handle using the digital input of the switches and the analog voltage level to determine the actual handle position of each handle. Calibration data stored in the non-volatile memory 52 is used in determining the handle position to compensate for minor manufacturing differences, drift or cause of variation from system to system. This handle position information is provided to the rest of the system in a standard format. Information in a fault summary can also be used to determine the handle position as some faults may indicate improper handle positions. For example, if a release switch is known to have failed, it can be ignored, but if one of the analog inputs fail, the fault handle position must be assumed. The handle positions are then transmitted over the Lon network through transceiver 42.

The microcomputer 40 also takes the standard handle information being provided to the system and calculates an appropriate value to display locally, depending upon the display configuration determined by the system. These outputs are provided via buffer output 60 to the display 33.

In order to give the engineer instantaneous information about handle movement without inherent delays of the system, a minimum of three display modes are available. These include the target equalization reservoir value, the target brake pipe reduction value or the percentage of full travel of the handle. When the target equalization reservoir is displayed, the equalization reservoir target of the automatic handle position will be used. When target brake pipe reduction is displayed, the difference between the release value of the equalization reservoir and the equalization reservoir target will be displayed. When the percentage of full travel is displayed, the relative position will be displayed where zero would equal release and 100 would be the emergency position of the automatic handle.

Also, the display could indicate the zones in which the handle occurs. For example, the following zones could be displayed with the appropriate abbreviation:

| | |
|---|---|
| Release = | REL |
| Minimum Application = | MIN |
| Service Application = | SRV0 through SRV9 |
| Full Service = | FULL |
| Suppression = | SUPP |
| Handle Off = | HO |
| Emergency = | EMRG |

The display configuration data will be stored in the non-volatile memory 52. The display configuration can be programmed locally through an input or may be received over the LonWorks. If the microcomputer is a Neuron chip, the configuration would be transmitted over the LonWorks. Similarly, the reading of its digital and analog input as well as the calculation of the handle positions and reporting would also be controlled remotely over the Lon network. Preferably, the default display mode is the equalization reservoir target. A test pattern can also be stored and displayed wherein all segments will be flashed on and off for ten seconds.

The microcomputer 40 can also run diagnostic programs continuously. Switch positions will be checked against analog values to determine whether either of the handles have failed. Failures or other faults will be logged in an event log and fault summary and an event message will be sent to the system indicating the source of the problem.

Preferably, the display is an alphanumeric dot matrix type of display with built in LED backlights. The display will have two rows with 16 characters per row. This will allow an alpha-display of the name of the information being provided as well as an additional display of the values or alpha display of the zones.

Although the description with respect to FIG. 3 shows receiving inputs from a dual handle controller, the electronic logic and the providing of the display can be used with any other brake operator controller, whether it be a single handle or multiple handles, or push buttons. If push buttons are used as the brake operators, the amount of braking is proportional to the amount of time the button is depressed alone or in combination with the depth of the button. Also, the digital and analog inputs represented are from presently available systems, for example, in the CCB available from New York Air Brake Corporation. Different input signals from other types of handles and electronics may be inputted and used by the circuitry of FIG. 3. For locomotives not equipped with a control display for the operator, other brake data or parameters may be displayed on display 33. The data or parameters may be in the microcomputer or received via the network. These may include locomotive and train settings or equalization reservoir settings as well as the results of the diagnostic programs. Although a microcomputer 40 is shown as a Neuron, other microcomputers having greater capability may be provided.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. An electronic brake controller for an electropneumatic brake system comprising:

a discrete housing to be mounted in an electropneumatic brake system;

at least one brake operator mounted to said housing and whose position defines a desired brake action;

a display on said housing;

an output on said housing providing operator position signals;

an electronic controller in said housing which determines the position of said operator and provides said operator position signals to said output and drives said display to instantly display said desired braking action as a function of the determined position of said operator.

2. An electronic brake controller according to claim 1, wherein said controller drives said display to display target equalization reservoir pressure as a function of the determined position of said operator.

3. An electronic brake controller according to claim 2, wherein said controller has programmable modes and display of target equalization reservoir pressure is a default display mode.

4. An electronic brake controller according to claim 1, wherein said controller drives said display to display target brake pipe reduction as a function of the determined position of said operator.

5. An electronic brake controller according to claim 1, wherein said controller drives said display to display percentage of full travel of the operator as a function of the determined position of said operator.

6. An electronic brake controller according to claim 1, wherein said controller drives said display to display the name of the zone a operator is in.

7. An electronic brake controller according to claim 6, wherein said zones include release, minimum application, service application from 0 to 9, full service application, and emergency.

8. An electronic brake controller according to claim 7, wherein said zones further include suppression and operator off.

9. An electronic brake controller according to claim 1, wherein said controller has programmable display modes.

10. An electronic brake controller according to claim 1, wherein said brake operator includes an automatic brake operator and an independent brake operator; and wherein said controller determines the position of both operators and provides operator position signals for both operators to said output.

11. An electronic brake controller according to claim 1, wherein said controller includes:

quantitative input means for providing a quantitative input signal representing the variable position of said operator; and qualitative input means for providing a qualitative input signal representing at least one fixed position of said operator.

12. An electronic brake controller according to claim 1, wherein said operator includes a push button and said controller drives said display to display said desired braking action as a function of the determined position and length of time said button has been in said determined position.

13. An electronic brake controller according to claim 1, wherein said controller includes an external input and drives said display in response to signals received on said external input.

14. An electronic brake controller according to claim 1, wherein said controller includes diagnostic programs.

15. An electronic brake controller according to claim 1, wherein said controller provides an event message at said output when said diagnostic program determines a fault.

16. An electronic brake controller for an electropneumatic brake system comprising:

a discrete housing means, to be mounted in an electropneumatic brake system, for housing said brake controller;

at least one brake operator means mounted to said housing means for defining a desired brake action pressure;

a display means on said housing means for displaying said desired brake action pressure; and an electronic controller means in said housing means for determining the position of said operator means and driving said display means to instantly display said desired braking action pressure as a function of the determined position of said operator means.

17. An electronic brake controller according to claim 16, wherein said controller means drives said display means to display target equalization reservoir pressure as a function of the determined position of said operator means.

18. An electronic brake controller according to claim 17, wherein said controller means has programmable modes and display of target equalization reservoir pressure is a default display mode.

19. An electronic brake controller according to claim 16, wherein said controller means drives said display means to display target brake pipe reduction as a function of the determined position of said operator means.

20. An electronic brake controller according to claim 16, wherein said brake operator means includes an automatic brake operator and an independent brake operator.

21. An electronic brake controller according to claim 16, wherein said operator means includes a push button and said controller means drives said display means to display said desired braking action pressure as a function of the determined position and length of time said button has been in said determined position.

22. An electronic brake controller for an electropneumatic brake system comprising:

at least one brake operator whose position defines a desired brake action;

a display;

an electronic controller which determines the position of the operator, determines the desired braking action as a function of the determined position of the operator and drives the display to instantly display the determined desired braking action.

23. An electronic brake controller according to claim 22 including an output providing operator position signals to an electropneumatic brake system and the electronic controller provides said operator position signals to the output.

24. An electronic brake controller according to claim 22, wherein the controller drives the display to display target equalization reservoir pressure as a function of the determined position of the operator.

25. An electronic brake controller according to claim 24, wherein the controller has programmable modes and display of target equalization reservoir pressure is a default display mode.

26. An electronic brake controller according to claim 22, wherein the controller drives the display to display target brake pipe reduction as a function of the determined position of the operator.

* * * * *